Aug. 30, 1966          V. J. WHATTOFF          3,269,751
                       ADJUSTABLE HITCH
Filed Feb. 11, 1964                         3 Sheets-Sheet 1

INVENTOR
VERNARD J. WHATTOFF
BY Rudolph L. Lowell
ATTORNEY

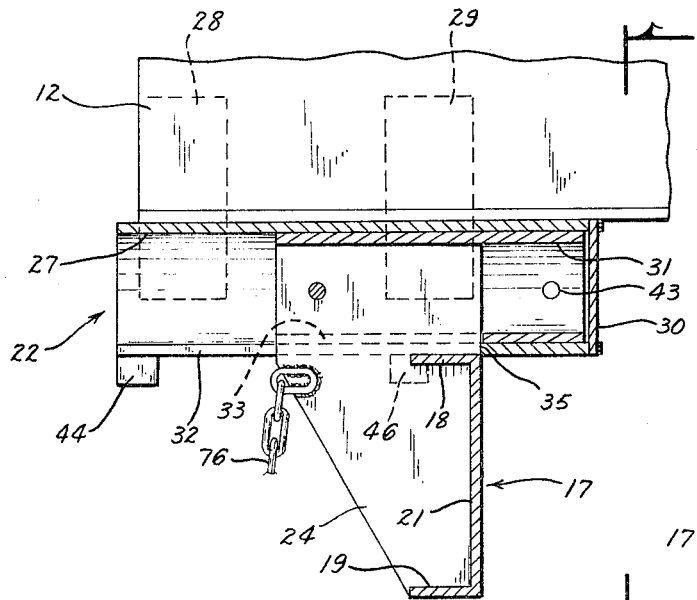
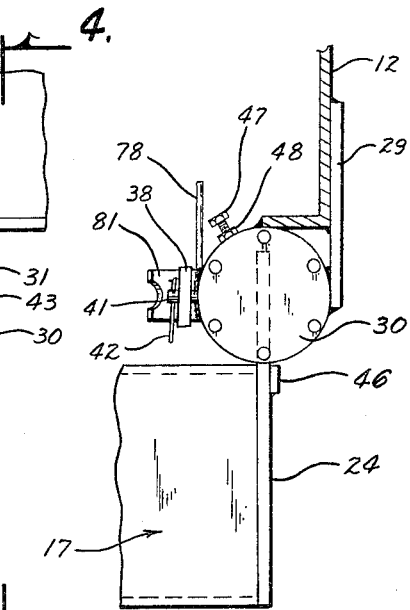
Fig. 3    Fig. 4
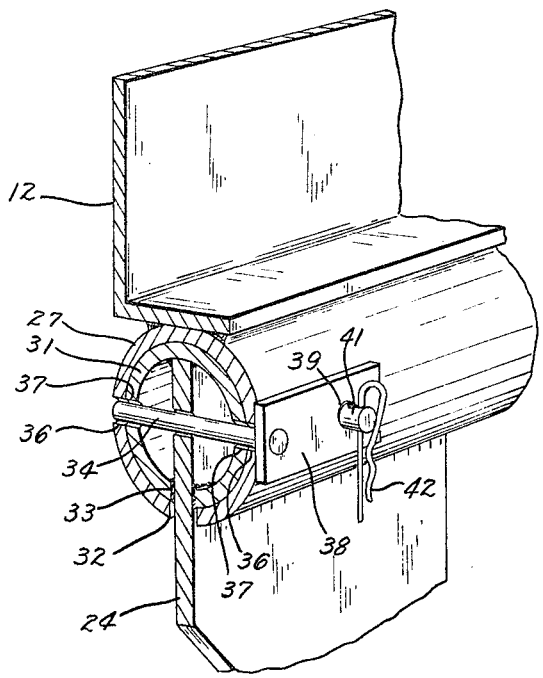
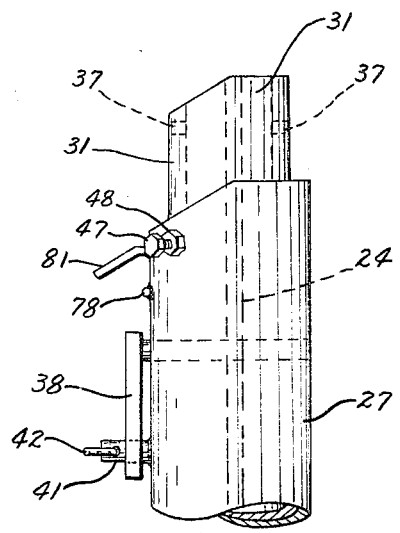
Fig. 5    Fig. 6
INVENTOR
VERNARD J. WHATTOFF
BY Rudolph L. Lowell
ATTORNEY

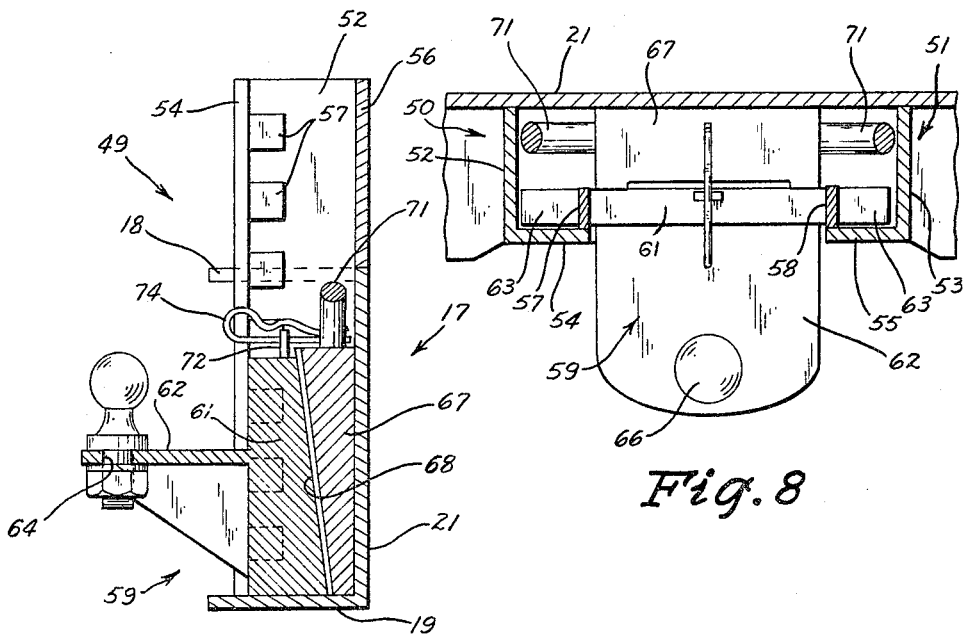
Fig. 7
Fig. 8
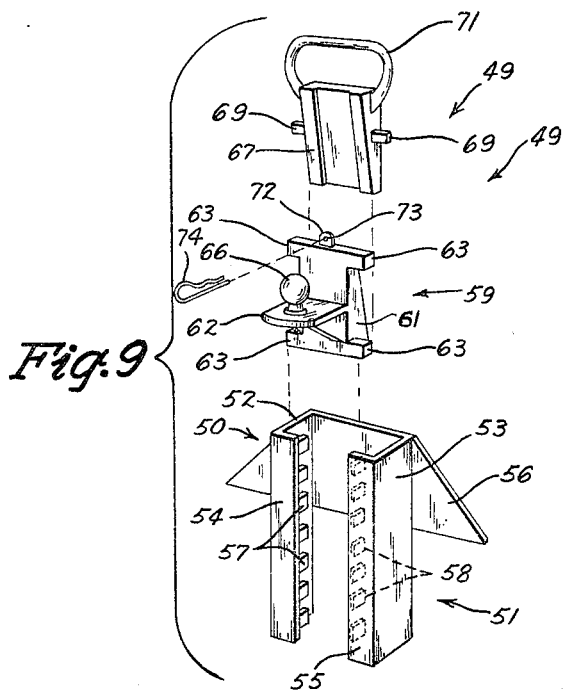
Fig. 9

# United States Patent Office 3,269,751
Patented August 30, 1966

3,269,751
ADJUSTABLE HITCH
Vernard J. Whattoff, Ames, Iowa, assignor to Whattoff Motor Co., a partnership, Ames, Iowa
Filed Feb. 11, 1964, Ser. No. 344,129
6 Claims. (Cl. 280—482)

This invention relates to a vehicle coupling device and more particularly to a hitch for connecting a trailer to a truck tractor.

It is the object of this invention to provide an improved trailer hitch which is adjustable in a vertical direction to accommodate trailers of varying heights and adjustable longitudinally to vary the over-all length of the tractor and trailer combination.

Another object of the invention is to provide a trailer hitch mountable on the rear of a truck tractor which can be vertically and horizontally adjusted with a single tool in a minimum period of time.

A further object of the invention is to provide a hitch for coupling a trailer to a tractor which can be adjusted to change the over-all length of the tractor and trailer combination without disconnecting the trailer from the tractor.

An additional object of the invention is to provide a heavy duty trailer hitch which is economical to manufacture and reliable and safe in use.

Further objects, features and advantages of this invention will appear from the following description and accompanying drawing, in which:

FIG. 3 is an enlarged sectional view taken along the line 3—3 of FIG. 2;

FIG. 4 is a sectional view taken along the line 4—4 of FIG. 3;

FIG. 5 is a fragmentary perspective view partly in section showing the lock connection between the longitudinally adjustable members of the hitch;

FIG. 6 is a foreshortened plan view of the longitudinally adjustable members in the extended position;

FIG. 7 is an enlarged sectional view taken along the line 7—7 of FIG. 2;

FIG. 8 is an enlarged sectional view taken along the line 8—8 of FIG. 2; and

FIG. 9 is an exploded perspective view of the structure for vertically adjusting the hitch.

Figure 1:
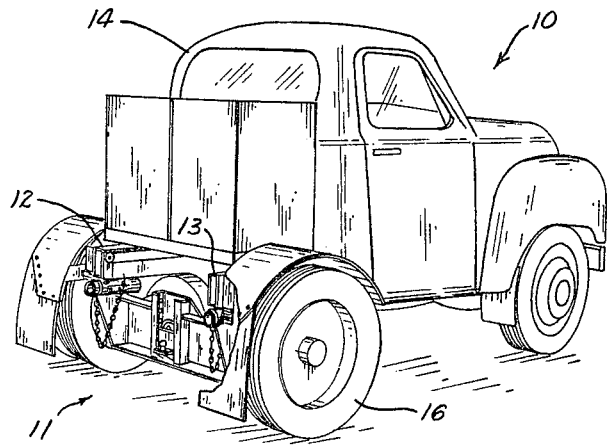
FIG. 1 is a perspective view of a truck tractor equipped with the trailer hitch of the present invention.

Referring to the drawing, there is shown in FIG. 1, a truck tractor 10 equipped with a trailer hitch 11. The tractor 10 is a commercial vehicle having a pair of longitudinal channel-shaped frame members 12 and 13 and a cab 14. The rear sections of the frame members 12 and 13 are horizontally supported above the ground by a drive wheel and axle assembly 16. The hitch 11 is mounted on the lower sides of the rear sections of the frame members 12 and 13 rearwardly of the drive differential of the wheel and axle assembly 16.

In use the hitch 11 is employed to connect a trailer, such as a mobile home, to the tractor 10. In order to couple trailers of different sizes to the tractor, the hitch 11 is adjustable in both a longitudinal direction and a vertical direction.

Figure 2:
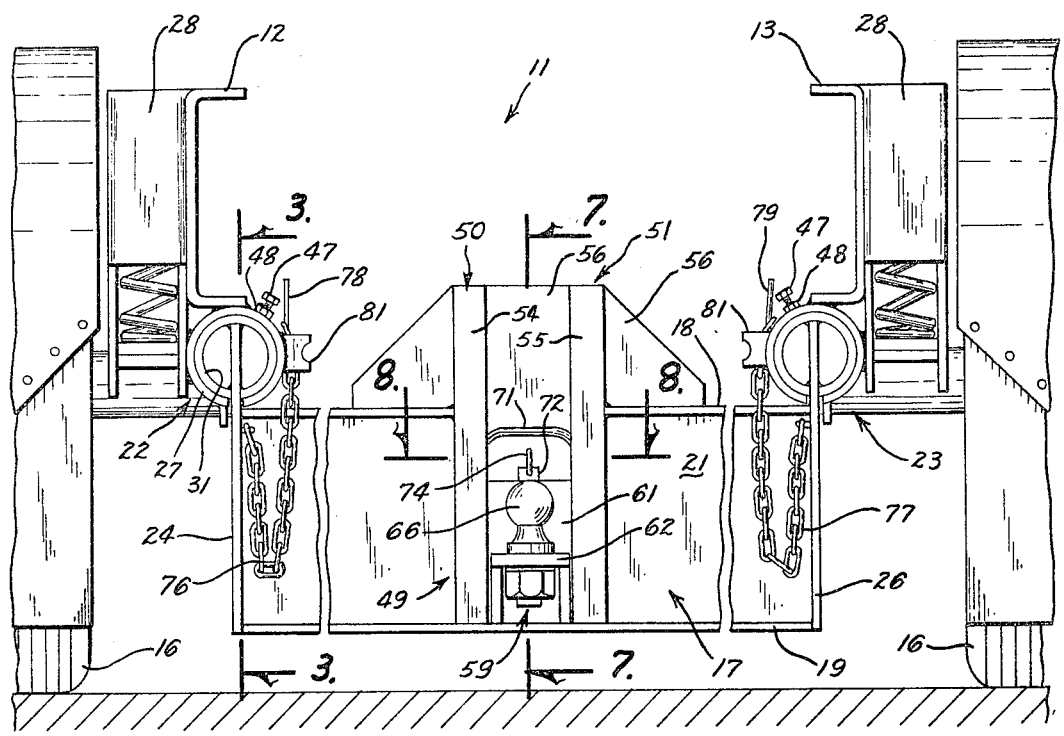
FIG. 2 is an enlarged elevational view of the rear of the tractor of FIG. 1.

As shown in FIG. 2, the hitch 11 comprises a transverse channel beam 17 having rearwardly projected top and bottom flanges 18 and 19, respectively, and an upright wall 21. The channel beam 17 is attached to the frame members 12 and 13 by longitudinally adjustable assemblies 22 and 23, respectively. Upright plates 24 and 26 are secured to the opposite ends of the channel beam 17 and attach the beam to the assemblies 22 and 23 which are identical in construction and function to support the opposite ends of the channel beam 17. The following description is limited to the details of the adjustable assembly 22.

As shown in FIGS. 2 and 3, the adjustable assembly 22 comprises a longitudinally extended tubular member 27 secured by welds to the bottom flange of the frame member 12 and to the side wall of a spring box 28. A downwardly extended plate 29 is welded to the forward section of the tubular member 27 and to the side of the frame member 12 (FIG. 4). The front end of member 27 carries a cap 30 to protect the inside of the member from dirt and other foreign materials.

A movable tubular member 31 is telescoped in the tubular member 27. By way of example, the outer tubular member 27 may have half inch walls and a four inch inside diameter and the movable inner tubular member 31 a three and seven-eighths inch outside diameter. Referring to FIG. 6, it is seen that the rear ends of the tubular members 27 and 31 have their inside wall sections removed to provide added clearance for the tongue of the trailer during relative turning movement between the tractor and the trailer.

The upright plate 24 (FIG. 5) projects through a longitudinal slot 32 in the bottom sector or wall portion of the tubular member 27 and a slot 33 in the tubular member 31. The top edge of the plate 24 is welded to the top sector of the tubular member 31. In addition, the plate 24 is welded to the bottom sector of the tubular member 31 thereby rigidly connecting the plate 24 to the tubular member 31.

As shown in FIG. 3, the slot 33 in the bottom sector of the tubular member 27 does not extend over the entire length of the member. As a result the inner end 35 of the slot 32 forms a stop which is engaged by the plate 24 to limit the inward or forward movement of the channel beam 17. In this position the upright wall 21 of the channel beam is spaced approximately one inch from the differential of the wheel and axle assembly 16.

As shown in FIG. 5, the tubular members are interlocked by a transverse pin 34 which projects through horizontally aligned holes 36 and 37 in the tubular members 27 and 31, respectively. A short plate 38 is secured to the one end of the pin 34 and extends in a forward direction. The forward section of the plate 38 has a hole 39 for accommodating a laterally projected stud 41 secured to the tubular member 27. The outer end of the stud 41 has a transverse hole for receiving a quick release wire snap pin 42 which functions to maintain the plate 38 on the stud 41, and in turn the pin 34 against movement transversely of the tubular members 27 and 31.

As shown in FIG. 3, the forward section of the tubular member 31 has transverse holes 43 which are used to accommodate the pin 34 when the tubular member 31 is moved to the out or rearwardly extended position. The rearward movement of the tubular member 31 with respect to the member 27 is limited by a downwardly projected stop 44 secured to the lower section or wall portion of the tubular member 27. Secured to the outside of the plate 24 in longitudinal alignment with the stop 44 is a plate 46 which engages the forward surface of the stop 44 thereby limiting the rearward movement of the channel beam 17. The pin 34 inserted through the holes 36 and 43 locks the channel beam 17 in the out or rearwardly extended position.

As shown in FIG. 2, a set screw 47 carrying a lock nut 48 is threaded into the tubular member 27. The set screw, when the members 27 and 31 are locked against relative axial movement by the pin 34, is adjusted to engage the inner tubular member 31 and functions to minimize the lateral play or transverse movement of the inner tubular member 31 relative to the outer tubular member 27.

A hitch unit 49 (FIG. 2) mounted on the center section of the channel beam 17, comprises a pair of upright angle members 50 and 51 having longitudinal flanges 52 and 53 and transverse end flanges 54 and 55 positioned rearwardly of the channel beam wall 21 and projected toward each other. The angle members 50 and 51 project through an opening in the top flange 18 of the beam 17 and are secured to the upright wall 21 and the flanges 18 and 19 of the channel beam 17. Upright plates 56 are positioned in front of the top sections of the angle members 50 and 51 and are secured to the longitudinal flanges 52 and 53 and the top of the channel beam 17 forming an extension of the upright wall 21.

As shown in FIG. 9 a plurality of vertically spaced teeth 57 and 58 are secured to the inside or forward portions of the flanges 54 and 55, respectively. The teeth 57 and 58 project toward the upright wall 21 and plate 56 and have a length of about one-half the distance between the flanges 54 and 55 and the upright wall 21. Corresponding teeth 57 and 58 on the upright members 50 and 51 are positioned at subtsantially the same elevation.

A T-shaped block or draft member indicated generally at 59 having an upright body of a generally rectangular shape and a rearwardly projected table 62 is carried by the upright angle members 50 and 51. The outer end section of the table 62 has a vertical hole 64 accommodating a tow ball nut and bolt assembly 66. As shown in FIG. 9, each corner of the body 61 has a laterally projected ear 63. The spaced relationship between vertically opposite ears 63 corresponds to the spacing between the teeth 57 and 58 carried by the upright members 50 and 51. The width of the table 62 is slightly smaller than the transverse distance between the flanges 54 and 55. When the table 62 projects through the space between the flanges 54 and 55 the ears 63 on the body 61 are positioned between pairs of teeth 57 and 58 thereby locking the T-shaped block 59 in a selected elevated position. When the T-block 59 is assembled on the upright members 50 and 51, the ends of the ears 63 are in a close clearance relation with the longitudinal flanges 52 and 53 thereby minimizing the lateral movement of the T-block 59 relative to the upright members 50 and 51.

The block 59 is held in a locked position on the angle members 50 and 51 by a wedge 67 interposed between the front wall 68 of the body 61 and the upright wall 21 of the channel beam 17. The wedge 67 and the front wall 68 of the body 61 have coacting inclined surfaces which function to force the block 59 in a rearward direction when the wedge 67 is moved downwardly between the body 61 and the upright wall 21. The wedge 67 has a pair of ears 69 projected laterally from the opposite sides thereof. An inverted U-shaped handle 71 is secured to the top portion of the opposite sides of the wedge 67. The ends of the ears 69 and the sides of the handle 71 are in a close clearance relation with the longitudinal flanges 52 and 53 of the members 50 and 51 and thereby maintain the wedge 67 in coacting wedging alignment with the body 61.

As shown in FIGS. 8 and 9, the top of the body 61 has an upright tab 72 formed with a hole 73. A snap pin 74 is positioned in the hole 73 with a portion thereof extended over the top of the wedge 67. The pin 74 functions as a safety lock preventing the wedge 67 from working itself in an upward direction and loosening the block 59 from a locked wedged position.

As shown in FIG. 2, a pair of trailer safety chains 76 and 77 are carried on the upright plates 24 and 26, respectively. The chains 76 and 77 are looped over upright fingers 78 and 79 secured to the outer tubular members 27. In use, the chains 76 and 77 are coupled to the trailer to form a safety linkage between the tractor and the trailer.

The hitch unit 49 is longitudinally adjustable with respect to the frames 12 and 13 of the tractor by removing the transverse pins 34 from the tubular members 27 and 31. This is accomplished by the use of a tool which is fulcrumed on laterally extended arms 81 secured to the tubular members 27 rearwardly of the holes 36 therein. The end of the tool is placed under the flat plate 38 and moved to pull the pin 34.

After the set screws 47 have been released the channel beam 17 is longitudinally movable to either an in or out position. The inner tubular members 31 slide within the outer tubular members 27 in a longitudinal direction between the stop 44 and the end 35 of the slot 32. When the hitch unit 49 has been moved to either the in or out position the transverse holes in the outer tubular members 27 and the inner tubular members 31 are in alignment permitting the re-insertion of the pins 34 thereby locking the tubular members in an adjusted position. The set screws 47 are then turned down to eliminate lateral play between corresponding tubular members 27 and 31.

In order to change the elevation of the ball of the tow ball assembly 66 the snap pin 74 is removed from the tab 72 and wedge 67 is forced in an upright direction by a lifting tool which engages the handle 71. This tool is the same tool as the one used to pull the pins 34. With the wedge 67 removed, the block 59 is free to move in a forward direction toward the plate 21. When the ears 63 are out of locking engagement from between pairs of teeth 57 and 58 the block 59 may be raised or lowered to a new position.

Rearward movement of the block 59 positions the ears 63 between adjacent pairs of teeth 57 and 58 carried by the flanges 54 and 55. When the wedge 67 has been replaced between the body 61 and the upright wall 21, the block 59 is locked in an adjusted position. The spreading action of the wedge 67 forces the ears 63 into engagement with the inside surfaces of the upright flanges 54 and 55 thereby eliminating relative longitudinal movement between the body 61 and the upright angle members 50 and 51. The snap pin 74 is then inserted through the hole 73 of the tab 72 so as to prevent the wedge 67 from moving in an upward direction.

In summary, the trailer hitch 11 is mounted on the frame of the truck tractor 10 by carrying assemblies 22 and 23 which are longitudinally adjustable for changing the longitudinal position of the hitch with respect to the tractor frame. With this adjustment the over-all length of the tractor and trailer may be varied without uncoupling the trailer from the tractor.

The carrying assemblies 22 and 23 support a transverse channel beam 17 having a vertically adjustable hitch unit 49. Included in the hitch unit 49 is a T-shaped block 59 which is adjustably positioned on a pair of upright angle members 50 and 51. The block 59 has laterally extended ears 63 which coact with pairs of teeth 57 and 58 on the upright members 50 and 51 to hold the block at a selected elevation. A wedge 67 retains the block 59 in its locked position.

While there have been shown, described, and pointed out the fundamental novel features of the invention it is to be understood that various omissions, substitutions, of the trailer hitch illustrated may be made by those skilled in the art, without departing from the scope of the invention which is to be limited only as indicated by the appended claims.

I claim:

1. A hitch for effecting a connection between a trailer and a truck tractor having a pair of longitudinal frame members comprising:

(a) first tubular means positioned longitudinally of and secured to the rear portions of the frame members, (b) second tubular means slidably positioned in the first tubular means, (c) means for locking the second tubular means in selected longitudinal positions relative to the first tubular means, (d) transverse beam means having an upright wall secured to said second tubular means and movable therewith to selected longitudinal positions, (e) a pair of upright angle members having longitudinal flanges and transverse flanges, said angle members positioned in a spaced substantially parallel side-by-side relation with the longitudinal flanges secured to the upright wall and the transverse flanges facing each other, (f) a plurality of teeth means secured to the transverse flanges, said teeth being spaced along the length of the transverse flanges and projected toward the upright wall, (g) block means having lateral ears selectively positionable between pairs of teeth on the transverse flanges to adjust the elevation of the block means and a table carrying a tow ball projected between said transverse flanges, and (h) wedge means positionable between said upright wall and block means for holding the block means in engagement with the transverse flanges.

2. A hitch for effecting a connection between a trailer and a truck tractor having a pair of longitudinal frame members comprising:

(a) first tubular means positioned longitudinally of and secured to the rear portions of the frame members, (b) second tubular means slidably positioned in the first tubular means, (c) means for locking the second tubular means in selected longitudinal positions relative to the first tubular means, (d) transverse beam means having an upright wall secured to said second tubular means and movable therewith to selected longitudinal positions, (e) upright means secured to said beam with a portion thereof spaced from said wall, (f) draft means having a portion thereof positionable at selected elevations between said portion of the upright means and said upright wall, (g) coacting lock means on the upright means and draft means for positioning the draft means at a selected elevation on the upright means, and (h) means positionable between the draft means and upright wall for holding the coacting lock means in a locked position.

3. A hitch for coupling a trailer and a truck having a longitudinal frame comprising:

(a) a beam having an upright wall, (b) means for connecting the beam to the frame of the truck, (c) upright means secured to said beam, said upright means having a flange spaced from the upright wall, (d) draft means connectable to the trailer, (e) coacting lock means on the flange of the upright means and draft means operable to position the draft means at selected elevations on the upright means, and (f) means for holding the coacting means in a locked position.

4. The hitch defined in claim 3 wherein:

(a) the means for connecting the beam to the frame includes longitudinally adjustable members operable to change the longitudinal position of the hitch unit relative to the truck frame.

5. In a hitch, (a) an upright wall, (b) a pair of upright angle members having longitudinal flanges and transverse flanges, said angle members positioned in a spaced substantially parallel side-by-side relation with the longitudinal flanges secured to the upright wall and the transverse flanges facing each other, (c) a plurality of teeth secured to the transverse flanges, said teeth being spaced along the length of the transverse flanges and projected toward the upright wall, (d) block means having ears positionable between pairs of teeth on the transverse flanges and a table projected between said transverse flanges, and (e) wedge means positionable between said upright wall and block means operable to hold the block means in engagement with the transverse flanges.

6. In a hitch, (a) a beam having an upright wall, (b) means secured to said beam having an upright wall spaced from the upright wall of said beam, (c) draft means having a portion thereof positionable at selected elevations between said two upright walls, (d) coacting engageable means on one of said upright walls and on said draft means for positioning the draft means at a selected elevation between said upright wall, and (e) means positionable between the draft means and the other of said upright walls for locking the coacting engageable means in a selected elevated position.

References Cited by the Examiner
UNITED STATES PATENTS

| | | | |
|---|---|---|---|
| 1,870,689 | 8/1932 | Remde | 280—490 X |
| 2,589,678 | 3/1952 | De Lay | 280—407 |
| 2,756,073 | 7/1956 | Bridge | 280—425 |
| 2,807,477 | 9/1957 | Tuso | 280—407 |
| 2,837,226 | 6/1958 | Gutridge | 280—479 X |
| 2,847,232 | 8/1958 | Graham | 280—490 |
| 3,061,333 | 10/1962 | Sudeikis | 280—490 |

LEO FRIAGLIA, *Primary Examiner.*